United States Patent
Haertel et al.

(10) Patent No.: US 7,548,999 B2
(45) Date of Patent: Jun. 16, 2009

(54) CHAINED HYBRID INPUT/OUTPUT MEMORY MANAGEMENT UNIT

(75) Inventors: Michael Haertel, Sunnyvale, CA (US); Mark D. Hummel, Franklin, MA (US); Geoffrey S. Strongin, Austin, TX (US); Andrew W. Lueck, Austin, TX (US); Mitchell Alsup, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 89 days.

(21) Appl. No.: 11/623,615

(22) Filed: Jan. 16, 2007

(65) Prior Publication Data

US 2007/0168636 A1  Jul. 19, 2007

Related U.S. Application Data

(60) Provisional application No. 60/759,826, filed on Jan. 17, 2006.

(51) Int. Cl.
| | |
|---|---|
| *G06F 13/12* | (2006.01) |
| *G06F 13/38* | (2006.01) |
| *G06F 13/28* | (2006.01) |
| *G06F 3/00* | (2006.01) |
| *G06F 13/36* | (2006.01) |
| *G06F 13/42* | (2006.01) |
| *G06F 13/00* | (2006.01) |
| *G06F 9/26* | (2006.01) |
| *G06F 9/34* | (2006.01) |
| *G06F 15/16* | (2006.01) |

(52) U.S. Cl. ............ 710/62; 711/206; 711/202; 711/203; 710/23; 710/3; 710/314; 710/106; 710/33; 710/36; 709/201; 709/230

(58) Field of Classification Search .......... 710/62, 710/23, 3, 314, 106, 33, 36; 711/206, 202, 711/203; 709/201, 230
See application file for complete search history.

(56) References Cited

U.S. PATENT DOCUMENTS

| | | | | |
|---|---|---|---|---|
| 3,970,999 | A | * | 7/1976 | Elward .................. 711/2 |
| 4,550,368 | A | * | 10/1985 | Bechtolsheim ........... 711/206 |
| 5,088,031 | A | | 2/1992 | Takasaki et al. |
| 5,301,287 | A | | 4/1994 | Herrell et al. |

(Continued)

OTHER PUBLICATIONS

Motorola, "PowerPC 601 RISC Microprocessor User's Manual", Chapter 6, "Memory Management Unit", International Business Machines Corporation.*

(Continued)

*Primary Examiner*—Alford W Kindred
*Assistant Examiner*—Farley J Abad
(74) *Attorney, Agent, or Firm*—Lawrence J. Merkel; Meyertons, Hood, Kivlin, Kowert & Goetzel, P.C.

(57) ABSTRACT

In one embodiment, an input/output (I/O) node comprises an I/O memory management unit (IOMMU) configured to translate memory requests. The I/O node is configured to couple to an interconnect and to operate as a tunnel on the interconnect, and wherein the IOMMU is configured translate memory requests passing through the tunnel in the upstream direction. In another embodiment, a system comprises another I/O node configured to bridge another interconnect to the interconnect, wherein the I/O node is the tunnel for the other I/O node.

18 Claims, 5 Drawing Sheets

U.S. PATENT DOCUMENTS

| | | | |
|---|---|---|---|
| 5,317,710 A * | 5/1994 | Ara et al. | 711/207 |
| 5,574,936 A * | 11/1996 | Ryba et al. | 712/30 |
| 5,949,436 A | 9/1999 | Horan et al. | |
| 5,987,557 A | 11/1999 | Ebrahim | |
| 6,697,890 B1 | 2/2004 | Gulick et al. | |
| 6,791,554 B1 | 9/2004 | Mergard et al. | |
| 6,886,171 B2 | 4/2005 | MacLeod | |
| 6,928,529 B2 * | 8/2005 | Shinomiya | 711/203 |
| 7,035,963 B2 | 4/2006 | Neiger et al. | |
| 7,444,493 B2 * | 10/2008 | Schoinas et al. | 711/206 |
| 2006/0075146 A1 | 4/2006 | Schoinas et al. | |
| 2006/0277348 A1 | 12/2006 | Wooten | |

OTHER PUBLICATIONS

AMD, "AMD x86-64 Architecture Programmer's Manual", Sep. 2002, Chapter 5, "Page Translation and Protection", pp. 143-176.*

* cited by examiner

| Specific Int Ctls | IntTablePtr[51:6] | IG | IntTableLen [3:0] | IV |

| SysMgt [1:0] | IoCtl [1:0] | DomainID [15:0] | PageTablePtr [51:12] | Mode[2:0] | TV | V |

CHAINED HYBRID INPUT/OUTPUT MEMORY MANAGEMENT UNIT

This application claims benefit of priority to U.S. Provisional Patent Application Ser. No. 60/759,826, filed on Jan. 17, 2006.

BACKGROUND

1. Field of the Invention

This invention is related to the field of computer systems, and more particularly memory management mechanisms for input/output (PO) device-initiated requests.

2. Description of the Related Art

Computer systems of various types are ubiquitous in modern society, including personal computers (PCs), workstations, servers, various personal digital assistant (PDA) devices, etc. Most, if not all, of these computer systems have implemented memory management functionality for processor accesses to memory. Generally, the memory management functionality has included translating addresses from a virtual address space used by each process to a physical address space that spans the actual system memory, along with various memory protections (e.g. read only, read/write, privilege level requirements, etc.). The memory management functionality has a variety of uses: protecting the memory used by each process from unauthorized access by other processes; permitting large virtual spaces to be used by processes even if the physical memory system is not that large; relocation of virtual addresses to available physical memory without the participation of the process; etc.

While the processor addresses are frequently translated, addresses used by input/output (I/O) devices in computer systems are generally not translated. That is, the I/O devices use physical addresses to access memory. In a single operating system (OS) computer system, such as most PCs, the OS controls access to the I/O devices by other processes (applications and OS services). Accordingly, the OS can control which process has access to a given device at any given point in time, and can at least somewhat control the addresses accessed by the device. However, such mechanisms become more complicated and cumbersome in virtual machine systems, which may have multiple guest OSs running on a virtual machine monitor. Additionally, devices' use of physical addresses reduces the overall security of the system, since a rogue device (or a device programmed by a malicious software agent) can access memory unimpeded.

Even if translation were implemented for I/O devices, it is still desirable to support legacy devices which do not have translation functionality. Ensuring that such legacy devices still function in a system with I/O translation permits such devices to be used in the system, which may be a user desire or even a user requirement. Additionally, in some cases, it may be desirable for cost reasons to implement a newly designed device without including translation functionality.

SUMMARY

In one embodiment, an input/output (I/O) node comprises an I/O memory management unit (IOMMU) configured to translate memory requests. The I/O node is configured to couple to an interconnect and to operate as a tunnel on the interconnect, and wherein the IOMMU is configured to translate memory requests passing through the tunnel in the upstream direction.

In another embodiment, a system comprises a first I/O node configured to bridge a first interconnect to a second interconnect and a second I/O node configured to bridge a third interconnect to the second interconnect. The first I/O node is coupled to the second I/O node via the second interconnect, and the second I/O node is configured to operate as a tunnel for memory requests from the first I/O node travelling upstream. Additionally, the second I/O node comprises an IOMMU configured to translate memory requests from the third interconnect and to translate memory requests from the first I/O node.

In an embodiment, a method comprises receiving a memory request travelling upstream on a first interconnect in an input/output (I/O) node that operates as a tunnel on the first interconnect; translating the memory request using an I/O memory management unit in the I/O node; and forwarding the translated memory request further upstream.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

IOMMU Overview

Figure 1:
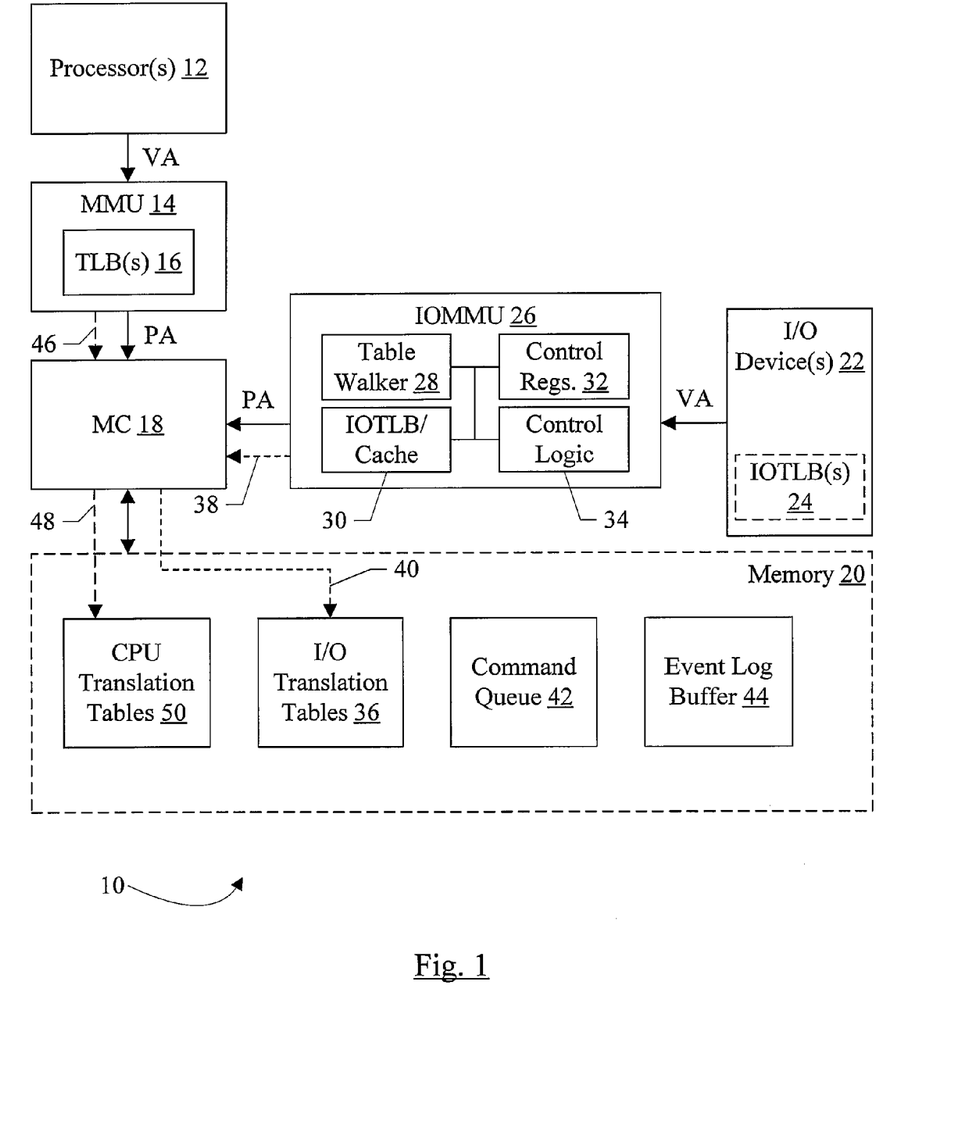
FIG. 1 is a block diagram of a high level view of one embodiment of a computer system.

FIG. 1 is a block diagram illustrating a simplified, high level view of one embodiment of a computer system 10. In the illustrated embodiment, the system 10 includes one or more processors 12, a memory management unit 14 comprising one or more translation lookaside buffers (TLBs) 16, a memory controller (MC) 18, a memory 20, one or more I/O devices 22 which may comprise one or more I/O TLBs (IOT-LBs) 24, and an I/O MMU (IOMMU) 26 which may comprise a table walker 28, an IOTLB/cache 30, control registers 32, and control logic 34. The processors 12 are coupled to the MMU 14, which is coupled to the memory controller 18. The I/O devices 22 are coupled to the IOMMU 26, which is coupled to the memory controller 18. Within the IOMMU 26, the table walker 28, the IOTLB 30, the control registers 32, and the control unit 34 are coupled.

As illustrated in FIG. 1, the path from the I/O devices 22 to the memory 20 is at least partially separate from the path of the processors 12 to the memory 20. Specifically, the path from the I/O devices 22 to memory 20 does not pass through the MMU 14. Accordingly, the MMU 14 may not provide memory management for the memory requests sourced from the I/O devices 22. Generally, memory management may comprise address translation from a virtual address (VA in FIG. 1) to a physical address (PA in FIG. 1) and memory protection. Memory protection may control read and/or write access to the memory at some level of granularity (e.g. a page), along with various other attributes such as privilege level requirements, cacheability and cache controls (e.g. writethrough or writeback), coherency, etc. Any set of memory protections may be implemented in various embodiments. In some embodiments, the memory protections implemented by the IOMMU 26 may differ from the memory protections implemented by the MMU 14, in at least some respects. In one embodiment, the memory protections implemented by the IOMMU 26 may be defined so that the translation tables storing the translation data used by the IOMMU 26 and the MMU 14 may be shared (although shown separately in FIG. 1 for ease of discussion). Other embodiments may not share translation tables between the IOMMU 26 and the MMU 14, as desired.

Generally, the I/O devices 22 may be configured to generate memory requests, such as memory read and write requests, to access memory locations in the memory 20. The memory requests may be part of a direct memory access (DMA) read or write operation, for example. The DMA operations may be initiated by software executed by the processors 12, programming the I/O devices 22 directly or indirectly to perform the DMA operations. Among other things, the I/O devices 22 may be provided with virtual addresses to access the memory 20. The virtual addresses may be translated by the IOMMU 26 to corresponding physical addresses to access the memory, and the physical addresses may be provided to the memory controller 18 for access. That is, the IOMMU 26 may modify the memory requests sourced by the I/O devices 22 to change the virtual address in the request to a physical address, and the memory request may be forwarded to the memory controller 18 to access the memory 20.

The IOMMU uses a set of I/O translation tables 36 stored in the memory 20 to translate the addresses of memory requests from the I/O devices 22. Generally, translation tables may be tables of translation data that can be used to translate virtual addresses to physical addresses. The translation tables may store the translation data in any fashion. For example, in one embodiment, the I/O translation tables 36 may include page tables similar to those defined in the x86 and AMD64™ instruction set architectures. Various subsets of the virtual address bits may be used to index levels of the table, and each level may either be the end of translation (i.e. storing a real page number for the translation) or may point to another table (indexed by another set of virtual address bits). The page may be the unit of translation (i.e. each address in the virtual page translates to the same physical page). Pages may have varying sizes, from 4 kilobytes up to Megabytes or even Gigabytes.

Additionally, the translation tables 36 may include a device table that maps devices to sets of page tables (e.g. by device identifier). The device identifier (ID) may be defined in a variety of ways, and may be dependent on the peripheral interconnect to which the device is attached. For example, Peripheral Component Interconnect (PCI) devices may form a device identifier from the bus number, device number and function number. HyperTransport™ devices may use a bus number and unit ID to form a device identifier. The device table may include a plurality of entries indexed by the device ID, and each entry may include a pointer to a set of page tables used by the device having the corresponding device ID. In some embodiments, the device table may also include a pointer to an interrupt remapping table to remap the device's interrupts. Thus, in general, a translation from a virtual address to a physical address may be stored in one or more entries in one or more translation tables, and some of the entries may be shared with other translations. Traversing the tables from entry to entry may be part of identifying the translation for the virtual address. In one embodiment, the translation tables 36 may include the interrupt remapping table mentioned above.

Specifically, the IOMMU 26 illustrated in FIG. 1 may include the table walker 28 to search the I/O translation tables 36 for a translation for a given memory request. The table walker 28 may generate memory requests, e.g. read memory requests, to read the translation data from the translation tables 36. The translation table reads are illustrated by dotted arrows 38 and 40 in FIG. 1.

To facilitate more rapid translations, the IOMMU 26 may cache some translation data. For example, the IOTLB 30 may be a form of cache, which caches the result of previous translations, mapping virtual page numbers to real page numbers and corresponding translation data. If a translation is not found in the IOTLB 30 for the given memory request, the table walker 28 may be invoked. In various embodiments, the table walker 28 may be implemented in hardware, or in a microcontroller or other processor and corresponding executable code (e.g. in a read-only memory (ROM) in the IOMMU 26). Additionally, other caches may be included to cache page tables, or portions thereof, and/or device tables, or portions thereof, as part of IOTLB/cache 30. Accordingly, the IOMMU 26 may include one or more memories to store translation data that is read from, or derived from, translation data stored in the memory 20.

The control logic 34 may be configured to access the IOTLB 30 to detect a hit/miss of the translation for a given memory request, and may invoke the table walker. The control logic 34 may also be configured to modify the memory request from the I/O device with the translated address, and to forward the request upstream toward the memory controller. Additionally, the control logic 34 may control various functionality in the IOMMU 26 as programmed into the control registers 32. For example, the control registers 32 may define an area of memory to be a command queue 42 for memory management software to communicate control commands to the IOMMU 26, in this embodiment. The control logic 34 may be configured to read the control commands from the command queue 42 and execute the control commands. Similarly, the control registers 32 may define another area of memory to be an event log buffer 44. The control logic 34 may detect various events and write them to the event log buffer 44. The events may include various errors detected by the control logic 34 with respect to translations and/or other functions of the IOMMU 26. The control logic 34 may also implement other features of the IOMMU 26.

The I/O devices 22 may comprise any devices that communicate between the computer system 10 and other devices, provide human interface to the computer system 10, provide storage (e.g. disk drives, compact disc (CD) or digital video disc (DVD) drives, solid state storage, etc.), and/or provide enhanced functionality to the computer system 10. For example, the I/O devices 22 may comprise one or more of: network interface cards, integrated network interface functionality, modems, video accelerators, audio cards or integrated audio hardware, hard or floppy disk drives or drive controllers, hardware interfacing to user input devices such as keyboard, mouse, tablet, etc., video controllers for video displays, printer interface hardware, bridges to one or more peripheral interfaces such as PCI ™, PCI EXPRESS® (PCIe®), PCI-X™, USB, FireWire, SCSI (Small Computer Systems Interface), etc., sound cards, and a variety of data acquisition cards such as GPIB or field bus interface cards, etc. The term "peripheral device" may also be used to describe some I/O devices.

In some cases, one or more of the I/O devices 22 may also comprise an IOTLB, such as IOTLBs 24. These IOTLBs may be referred to as "remote IOTLBs", since they are external to the IOMMU 26. In such cases, the memory requests that have already been translated may be marked in some fashion so that the IOMMU 26 does not attempt to translate the memory request again.

The memory controller 18 may comprise any circuitry designed to interface between the memory 20 and the rest of the system 10. The memory 20 may comprise any semiconductor memory, such as one or more RAMBUS DRAMs (RDRAMs), synchronous DRAMs (SDRAMs), DDR SDRAM, static RAM, etc. The memory 20 may be distributed in a system, and thus there may be multiple memory controllers 18.

The MMU 14 may comprise a memory management unit for memory requests sourced by a processor 12. The MMU may include TLBs 16, as well as table walk functionality. When a translation is performed by the MMU 14, the MMU 14 may generate translation memory requests (e.g. shown as dotted arrows 46 and 48 in FIG. 1) to the CPU translation tables 50. The CPU translation tables 50 may store translation data as defined in the instruction set architecture implemented by the processors 12.

The processors 12 may comprise any processor hardware, implementing any desired instruction set architecture. In one embodiment, the processors 12 implement the x86 architecture, and more particularly the AMD64™ architecture. Various embodiments may be superpipelined and/or superscalar. Embodiments including more than one processor 12 may be implemented discretely, or as chip multiprocessors (CMP) and/or chip multithreaded (CMT).

The system 10 illustrates high level functionality of the system, and the actual physical implementation may take many forms. For example, the MMU 14 is commonly integrated into each processor 12. While a memory 20 is shown, the memory system may be a distributed memory system, in some embodiments, in which the memory address space is mapped to multiple, physically separate memories coupled to physically separate memory controllers. The IOMMU may be placed anywhere along the path between I/O-sourced memory requests and the memory 20, and there may be more than one IOMMU. Still further, IOMMUs may be located at different points in different parts of the system.

Hybrid IOMMU in HT Chain

Figure 2:
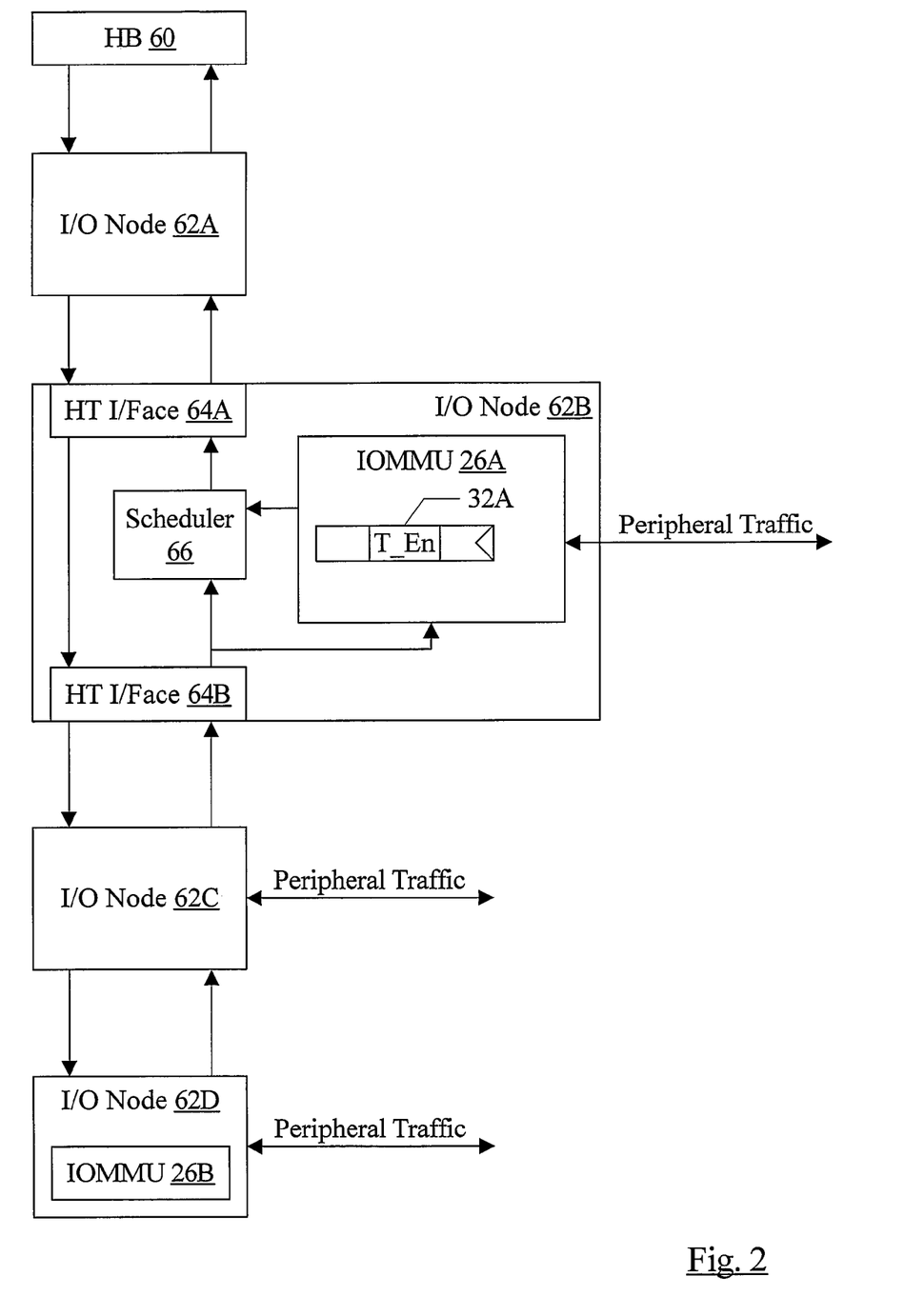
FIG. 2 is a block diagram of one embodiment of a HyperTransport™ chain of devices.

Turning now to FIG. 2, a block diagram illustrating one embodiment of a chain of I/O nodes on a HyperTransport™ (HT) noncoherent (I/O) fabric is shown. A host bridge 60 may be at one end of the chain, and may bridge the HT transactions to a coherent fabric that includes the processor(s) 12 and the memory system in a given system (e.g. the memory controller 18 and the memory 20, in the embodiment of FIG. 1). In one embodiment, the coherent fabric may also be based on HT using an HT coherent protocol. In such an embodiment, the host bridge may be part of a processing node. In other embodiments, any other coherent fabric may be used. A set of one or more I/O nodes (e.g. I/O nodes 62A-62D in FIG. 2) are coupled in daisy chain fashion via HT links. Communication on the HT links is in the form of packets, which may include read request packets, read response packets providing the read data, write request packets with data, done packets, etc.

Since the I/O nodes 62A-62D are coupled in daisy chain fashion, a packet issued by an I/O node may pass through one or more other I/O nodes to reach the host bridge 60. Similarly, packets issued from the coherent fabric to an I/O node 62A-62D may pass through one or more I/O nodes to reach the targeted I/O node. An I/O node that permits traffic for another node to pass through may be referred to as a tunnel. That is, the tunnel has two links, and transactions received on one link that are not targeted at the tunnel node are forwarded on the other link. Tunnels may also have I/O functionality (e.g. they may be an I/O device, an interface circuit to an I/O device, a bridge to another peripheral interconnect to which one or more I/O devices are coupled, etc.). For example, each of the I/O nodes 62B-62D is shown in FIG. 2 to receive peripheral traffic, which may be from a directly connected device or a peripheral interface to which one or more devices may be coupled.

Packets may be travelling from a sourcing node toward the host bridge 60, or from the host bridge 60 to a target node. A packet travelling from a sourcing node toward the host bridge (or more generally toward the host, which includes the processors and the memory system) is referred to as travelling upstream or in the upstream direction. A packet travelling from the host bridge to a target node is referred to as travelling downstream. The packet may also be referred to more briefly as an upstream packet or a downstream packet. Similarly, an I/O node may be referred to as upstream or downstream of another node. For example, the I/O node 62A may be upstream of the nodes 62B-62D.

In the illustrated embodiment, the I/O nodes 62B and 62D each include IOMMUs (reference numerals 26A-26B, respectively). The IOMMUs 26A-26B may each be similar to the IOMMU 26 shown in FIG. 1. The IOMMU 26B may translate the peripheral traffic bridged by the I/O node 62C. However, the I/O node 62C may not include an IOMMU. Accordingly, memory request packets generated by the I/O node 62C (in response to peripheral traffic bridged by the I/O node 62C) may not be translated. The I/O node 62C may, for example, be a legacy device that was designed before the IOMMU functionality described herein was defined. Alternatively, the I/O node 62C may not include IOMMU functionality intentionally, as a cost savings decision when designing the node.

The IOMMU 26A may provide the translation of the memory requests sourced by the I/O node 62C, in addition to providing translation for any memory requests bridged by the I/O node 62B from an attached I/O device. In the embodiment illustrated in FIG. 2, the I/O node 62B is illustrated in greater detail. HT interface circuits 64A-64B are shown, along with a scheduler circuit 66 and the IOMMU 26A. The HT interface circuit 64A is coupled to the HT interconnect to the node 62A, and the HT interface circuit 64B is coupled to the HT interconnect to the node 62C. That is, the HT interface circuit 64A is coupled to receive packets travelling in the downstream direction and to forward packets in the upstream direction. The HT interface circuit 64B is coupled to receive packets travelling in the upstream direction and to forward packets traveling in the downstream direction.

Since the IOMMU does not translate downstream packets, the HT interface circuit 64A may provide packets to the HT interface circuit 64B for forwarding further downstream. The HT interface circuit 64A may also provide downstream packets that are targeted at the I/O node 62B to circuitry within the I/O node 62B for further processing (not shown in FIG. 2). However, the upstream packets (using the I/O node 62B as a tunnel) may be translated by the IOMMU 26A. Additionally, even if the IOMMU 26A is not translating upstream packets, the IOMMU 26A may provide translated packets for the peripheral traffic received by the I/O node 62C. The scheduler 66 may receive packets from the HT interface circuit 64B and the IOMMU 26A and may schedule packets for forwarding further upstream by the HT interface circuit 64A. The scheduler 66 may implement any scheduling algorithm, e.g. various algorithms that attempt to optimize fairness, throughput, performance, etc. or combinations thereof.

In the illustrated embodiment, the IOMMU 26A may enabled or disabled for providing translation for packets travelling in the tunnel via a tunnel enable (T_En) bit in one of the control registers 32A. If the IOMMU 26A is enabled via the T_En bit, the memory requests received into the HT interface circuit 64B may be translated by the IOMMU 26A. If the IOMMU 26A is not enabled via the T_En bit, the memory requests are passed from the HT interface circuit 64B to the scheduler 66. Non-memory request packets received by the HT interface circuit 64B may also be passed directly to the scheduler 66.

In the illustrated embodiment, the I/O node 62D has the IOMMU 26B, and thus the packets sourced by the I/O node 62D have already been translated and may not be translated by the IOMMU 26A. In general, any number of IOMMUs may be downstream from the IOMMU 26A and may have translated requests from the corresponding VO node and/or any nodes downstream from that IOMMU. Accordingly, the IOMMU 26A may be configured to selectively translate the downstream requests. For example, in one embodiment, the request packets may include an indication of whether or not they have been translated (e.g. a "translated" bit). Alternatively, in one embodiment, the device ID (unit ID, in the case of HT) may be used to discern the translated requests from the untranslated requests. Since the unit ID indexes into the device table used by the IOMMU 26A, the device table entries corresponding to unit IDs that correspond to translated requests may indicate that translation is disabled (that is, that no translation is to be performed). The device table entries for other unit IDs (e.g. the unit ID or IDs used by the I/O node 62C) may point to I/O page tables to translate the requests. Each IOMMU in the chain may use its own device tables for translation.

In one embodiment, a downstream I/O node that has an IOMMU may use fewer unit IDs than a downstream I/O node that does not have an IOMMU Since the downstream I/O node with an IOMMU already has visibility to the incoming traffic (e.g. according to device identifier on the peripheral interface), the IOMMU in the downstream node may provide differing translation properties for different traffic, and thus distinguishing different traffic from this node in the upstream IOMMU may not be needed. An I/O node without an IOMMU, on the other hand, may use multiple device IDs (e.g. unit IDs) to provide indications of the source of various packets to the upstream IOMMU for translation. In other cases, the source ID extension field provided in HT packets may be used to carry additional source device identification (e.g. the device ID from the peripheral interface bridged by the downstream node) and the IOMMU may used the additional device ID data to translate requests.

Generally, an I/O node may comprise any circuitry configured to communicate on the peripheral interface (e.g. HT in this embodiment). Thus, an I/O node may include an I/O device, an interface to an I/O device (e.g. an adapter to couple the device to HT), and/or a bridge to another peripheral interface such as PCI, PCIe, USB, etc. It is noted that the present discussion may refer to translating a memory request. Such references may refer to translating the virtual address to a physical address (using cached translation data, or performing a table walk, as needed). Additionally, any attributes included in the translation data that apply to the request may be applied (e.g. read/write protection, etc.).

The HT interface circuits 64A-64B may comprise the circuitry for physically interfacing on the HT interconnect, and may also include buffering to store packets awaiting forwarding. The HT interface circuits 64A-64B may also comprise decode circuitry to identify packets targeted to the I/O node 62B, as compared to packets to be passed further upstream or downstream.

It is noted that, while the I/O node 62B illustrates packets passing directly downstream from the HT interface circuit 64A to the HT interface circuit 64B, the I/O node 62B may be symmetrical (and thus either HT interface circuit 64A or 64B may forward in the upstream direction). In such an embodiment, packets passing in either direction may pass through the scheduler 66, and control register programming, pin strapping to the I/O node 62B, or other such mechanisms may indicate which HT interface circuit 64A-64B is coupled to the upstream side or the downstream side.

It is noted that, while the I/O node 62B in the illustrated embodiment implements I/O functionality in addition to the IOMMU 26A (e.g. a bridge), other embodiments may implement an I/O node have only an IOMMU for translating memory requests travelling upstream through the I/O node's tunnel. Such an embodiment may be placed upstream of one or more I/O nodes that do not implement an IOU, to provide the MMU function on behalf of such I/O nodes.

Figure 3:
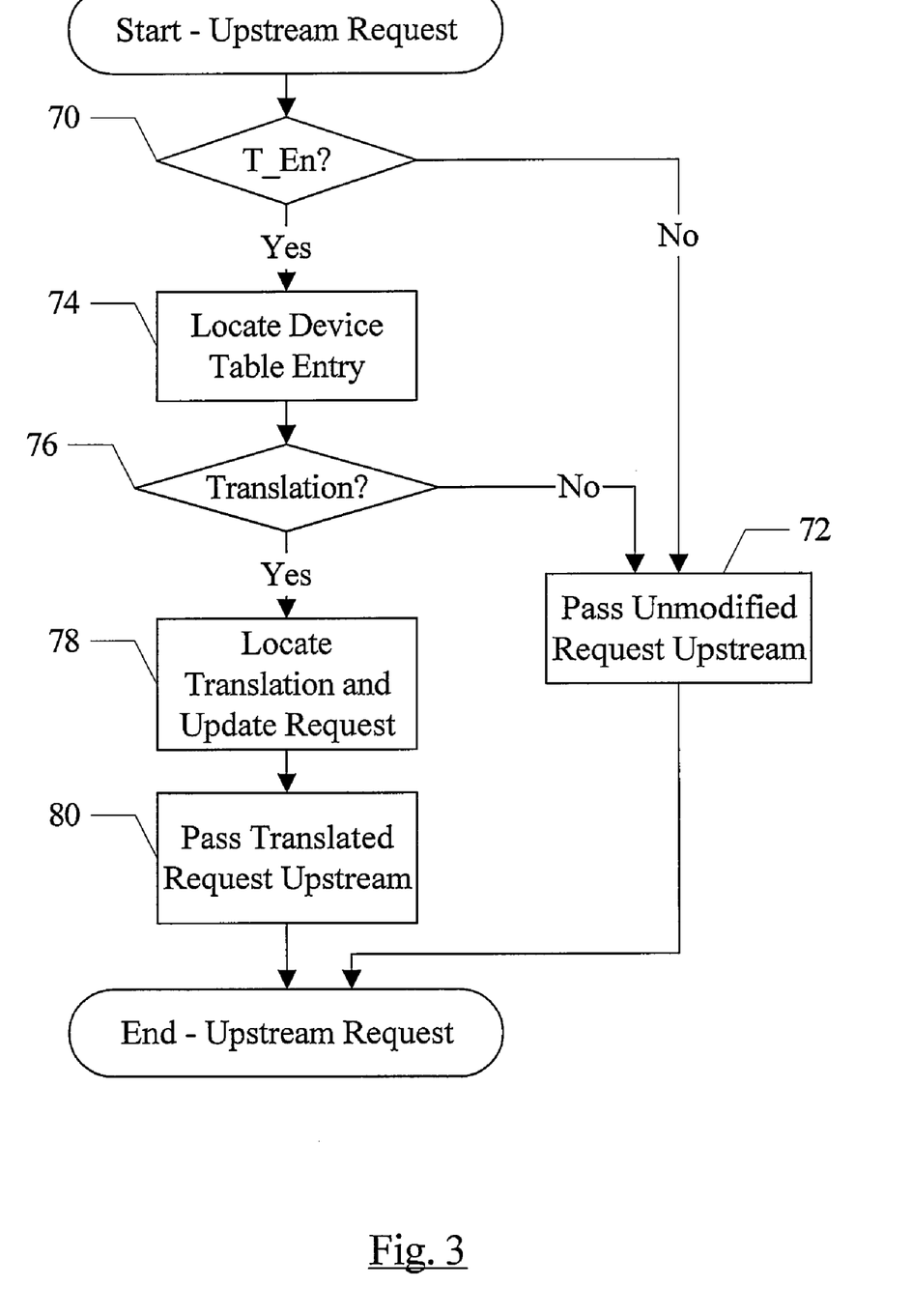
FIG. 3 a flowchart illustrating operation of one embodiment of an IOMMU shown in FIG. 2.

Turning next to FIG. 3, a flowchart is shown illustrating operation of one embodiment of the IOMMU 26A (and more particularly, the control logic 34 in the IOMMU 26A, for one implementation) in response to receiving a memory request that is travelling upstream in the tunnel of I/O node 62B. While the blocks are shown in a particular order for ease of understanding, other orders may be used. Blocks may be performed in parallel in combinatorial logic within the IOMMU 26A/control logic 34. Blocks, combinations of blocks, and/or the flowchart as a whole may be pipelined over multiple clock cycles.

If the T_En bit is clear (indicating disabled, in this embodiment—decision block 70, "no" leg), the IOMMU 26A is not enabled to translate tunneled requests and the I/O node 62B may pass the unmodified request upstream (block 72). If the T_En bit is set (indicating enabled, in this embodiment—decision block 70, "yes" leg), the IOMMU 26A may locate the device table entry that corresponds to the device (block 74). If the device table entry indicates that translation is disabled for the request (decision block 76, "no" leg), again the IOMMU 26A may pass the unmodified request upstream. The device table entry indicating translation is disabled may be useable, e.g., to pass requests that have previously been translated by a downstream IOMMU. If the device table entry indicates that translation is enabled (decision block 76, "yes" leg), the IOMMU 26A may locate the translation for the request and update the request to create the translated request (block 78). The IOMMU 26A may pass the translated request further upstream (block 80).

It is noted that the operation represented by the flowchart of FIG. 3 may be performed via a lookup of cached translation data in the IOMMU 26A. The data may cache the net effect of the translation, providing the translation or the decision to pass the packet unmodified in one operation. In other cases, table walk reads may be used to find the device table entry and translation entries. Not shown in FIG. 3 is a fault that may be signalled if a device table entry is not valid for the request, or if a translation is not found in the I/O page tables for the request.

Figure 4:
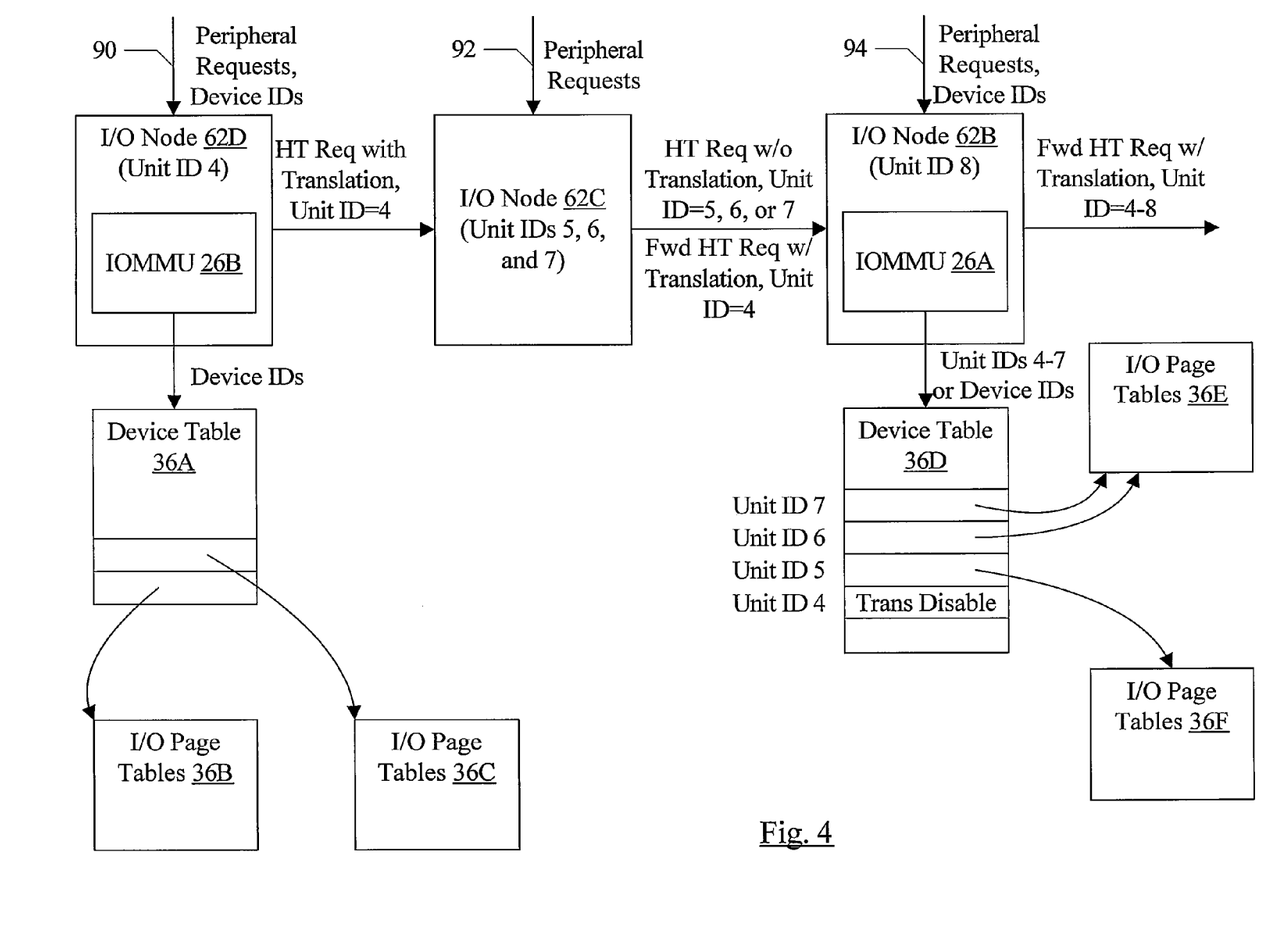
FIG. 4 is a block diagram of an example of using IOMMUs in some downstream nodes and not in other nodes.

FIG. 4 is a block diagram illustrating an example of the I/O nodes 62B-62D and translation operation for one embodiment. The I/O node 62D is shown, and is assigned unit ID 4 on the HT interconnect in this example. The I/O node 62D includes the IOMMU 26B, which includes a pointer to a device table 36A (one of the I/O translation tables 36 in the memory 20 as illustrated in FIG. 1). The device table 36A is indexed by device IDs for devices that generate the peripheral requests received by the I/O node 62D (arrow 90). Various device table entries in the device table 36A may point to one or more I/O page tables (e.g. reference numerals 36B and 36C in FIG. 4) which may be used to translate the requests. The I/O node 62D may forward translated request packets with the unit ID of 4 to the I/O node 62C.

The I/O node 62C may also receive peripheral requests (arrow 92), and may be assigned unit IDs 5, 6, and 7 in this example. The unit IDs may directly correspond to devices that generate the peripheral requests, may be assigned based on types of traffic, the device IDs used for the traffic, etc. The I/O node 62C may pass the translated request packets from the I/O node 62D (operating as a tunnel), and may generate untranslated request packets for the peripheral requests. The untranslated request packet have the unit ID 5, 6, or 7, as appropriate.

The VO node 62B may similarly receive peripheral requests with device IDs, in addition to operating as a tunnel for the request packets travelling upstream from the I/O nodes 62C-62D. The IOMMU 26A may be enabled to translate tunnel packets, in this example. Accordingly, the IOMMU 26A may index a device table 36D (which may be different than the device table 36A, in this example) using the unit IDs 4 through 7 or the device ID, as appropriate for the given request. The device table entries for unit IDs 5 to 7 are shown pointing to various I/O pages tables 36E-36F, to translate the requests. However, the device table entry for unit ID 4 indicates that translation is disabled. Accordingly, the (previously translated) request packets having unit ID 4 are not translated again and are passed unmodified (that is, in their previously translated form). Accordingly, in this example, the I/O node forwards translated request packets with unit IDs 4 to 8 (assigning unit ID 8 to peripheral requests received by the I/O node 62B) further upstream.

If there is more than one IOMMU that provides translation for request packets travelling through various nodes as a tunnel, different IOMMUs may provide translation for different originating I/O streams, if desired, by appropriately programming the device table(s) used by each IOMMU. In other examples, the device tables 36A and 36D may be the same table, since the IOMMU 26B indexes the device table with device IDs from the peripheral requests and the IOMMU 26A indexes the device table, for those requests, using the unit ID 4.

It is noted that, while the HT interconnect is used as an example herein, any interconnect on which a node may act as a tunnel for traffic from another node may be used. Furthermore, peripheral requests may be received on any desired peripheral interconnects or from a directly connected device.

Figure 5:
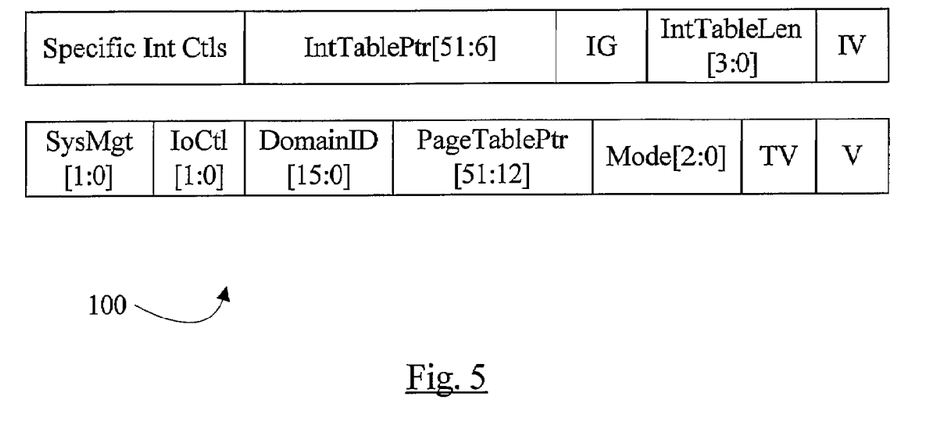
FIG. 5 is a block diagram of one embodiment of a device table entry for a device table shown in FIG. 2.

Turning now to FIG. 5, a block diagram of one embodiment of a device table entry 100 is shown. Other embodiments may implement supersets of the fields and other fields, subsets of the fields, or subsets in combination with other fields, as desired. The fields shown in FIG. 5 may be related to interrupt remapping and/or address translation, and other fields may be provided for other purposes in various embodiments. A field may comprise one or more bits, the encoding of which are assigned particular meanings when interpreted by the IOMMU 26. If a field is a single bit, for this embodiment, it is referred to as a bit. However, multibit fields for similar purposes may be used in other embodiments. Multibit fields are shown with bit ranges in FIG. 5, for this embodiment.

Various specific interrupt control bits may be provided in the specific interrupt control field to control whether certain specific interrupts are blocked or passed unmodified. For example, there may be control bits for legacy programmable interrupt controller (PIC) interrupt requests (Lint1 and Lint0) non-maskable interrupt (NMI), external interrupt, INIT interrupt, and or system management interrupt (SMI). Additionally, the specific interrupt control field may include a field to control how fixed and arbitrated interrupt messages are handled by the IOMMU 26. Encodings of this field may be used to specify that such interrupts are blocked, remapped using the interrupt remapping table, or forwarded unmodified, in one embodiment.

The interrupt table pointer field (IntTablePtr) may store the base address of an interrupt remapping table mentioned above. The interrupt table length (IntTableLen) specifies the extent of the interrupt table. The interrupt table length field may be encoded for several possible lengths (e.g. 1-2048 entries in powers of two, for one embodiment). The IG bit may be used to indicate whether or not event log entries in the event log buffer 44 are to be created if an I/O page fault is detected for an interrupt message. The interrupt valid (IV) bit may indicate whether or not the interrupt-related fields are valid. If the fields are not valid, the IOMMU 26 may pass all interrupts unmodified.

The SysMgt field may be encoded to provide further control of communications in the system management range. Specifically, in one embodiment, the SysMgt field may be encoded to: block requests in the range; forward requests in the range unmodified (posted writes only); forward requests that map to INTx messages unmodified (posted writes only); or translate requests using the I/O page tables. The IoCtl field may be encoded to provide further control of communications in the I/O space range. Specifically, in one embodiment, the IoCtl field may be encoded to: block requests in the range; forward the requests unmodified; or translate the requests using the I/O page tables.

The Domain ID is used to tag IOTLB entries and any other cache entries in the IOMMU 26 so that different devices differentiate their translation data. If devices share translation tables, they may have the same Domain ID to share cache/IOTLB entries. The Domain ID is completely under the control of software, and thus may permit flexibility for controlling software (e.g. a virtual machine monitor, or an operating system in non-virtual machine implementations) to group I/O devices into a domain to share translation data, or to separate the devices. For example, devices assigned to a given virtual machine may have the same Domain ID, and different Domain IDs may be used for different virtual machines. Any combination of separated devices and grouped devices may thus be created.

The page table pointer (PageTablePtr) is the pointer to the I/O page tables to be used by devices that access the device table entry 100. The mode field (Mode) may be coded to indicate the mode of translation. Specifically, an encoding of this field may indicate that translation is disabled (e.g. all binary zeros). Other encodings may indicate the level in the page table hierarchy at which translation is to begin for requests mapped to this entry. Thus, by coding the mode field for translation disabled for a device table entry corresponding to a downstream IOMMU, the translation of a previously translated request may be avoided. The TV bit indicates whether or not the page translation data are valid, and the V bit indicates if the entry 100 is valid.

Numerous variations and modifications will become apparent to those skilled in the art once the above disclosure is fully appreciated. It is intended that the following claims be interpreted to embrace all such variations and modifications.

What is claimed is:

1. An input/output (I/O) node comprising:

an I/O memory management unit (IOMMU) configured to translate memory requests, including translating addresses of memory requests; and the I/O node is configured to couple to an interconnect that comprises a plurality of links having a same protocol, and the I/O node is configured to couple to two of the plurality of links, and one of the two links is designated an upstream link and another one of the two links is designated a downstream link, and the I/O node is configured to operate as a tunnel on the interconnect, and wherein the IOMMU is configured to translate memory requests received from the downstream link and passing through the tunnel in the upstream direction on the interconnect, and the I/O node is configured to transmit the translated memory requests on the upstream link and wherein the IOMMU comprises a control register programmable with an enable indication indicating whether or not translation of the memory requests passing through the tunnel is enabled, wherein the IOMMU is configured to translate the memory requests passing through the tunnel if the enable indication indicates enabled, and wherein the IOMMU is configured to pass the memory requests unmodified if the enable indication indicates disabled, and wherein the I/O node is configured to transmit translated memory requests on the upstream link that are received from one or more I/O devices that are coupled to the I/O node separate from the interconnect, and wherein the IOMMU is configured to translate memory requests from the one or more I/O devices even if the enable indication indicates disabled.

2. The I/O node as recited in claim 1 wherein the I/O node is configured to transmit translated memory requests on the upstream link that are received from the one or more I/O devices that are coupled to the I/O node separate from the interconnect, and wherein the translated memory request from the one or more I/O devices comprises a device identifier assigned to the I/O node on the interconnect.

3. The I/O node as recited in claim 1 wherein the IOMMU is configured to access a device table comprising a plurality of device table entries, wherein the IOMMU is configured to select a device table entry responsive to a device identifier (ID) from a given memory request passing through the tunnel, wherein the device ID identifies a source of the given memory request, and wherein the device table entry includes either an indication that translation is disabled for the source or a pointer to one or more translation tables storing translation data to translate an address of the given memory request.

4. The I/O node as recited in claim 3 wherein the IOMMU is configured to pass the given memory request unmodified if the device table entry corresponding to the given memory request indicates that translation is disabled.

5. The I/O node as recited in claim 4 wherein the device table entry with translation disabled is useable for a downstream node on the interconnect that includes an IOMMU.

6. The I/O node as recited in claim 1 wherein the IOMMU is configured to select another device table entry responsive to a device identifier corresponding to one of the one or more I/O devices bridged by the I/O node to translate a memory request sourced by the I/O device.

7. A system comprising:

a first input/output (I/O) node configured to bridge a first interconnect to a second interconnect; and a second I/O node configured to bridge a third interconnect to the second interconnect, wherein the first I/O node is coupled to the second I/O node via the second interconnect, and wherein the second I/O node is configured to operate as a tunnel for memory requests from the first I/O node traveling upstream, and wherein the second I/O node comprises an I/O memory management unit (IOMMU) configured to translate memory requests from the third interconnect and to translate memory requests from the first I/O node, wherein translating the memory requests includes translating addresses of the memory requests, and wherein the IOMMU comprises a control register programmable with an enable indication indicating whether or not translation of the memory requests passing through the tunnel is enabled, wherein the IOMMU is configured to translate the memory requests passing through the tunnel if the enable indication indicates enabled, and wherein the IOMMU is configured to pass the memory requests unmodified if the enable indication indicates disabled, and wherein the second I/O node is configured to transmit translated memory requests on an upstream link that are received from one or more I/O devices that are coupled to the second I/O node separate from the interconnect, and wherein the IOMMU is configured to translate memory requests from the one or more I/O devices even if the enable indication indicates disabled.

8. The system as recited in claim 7 wherein the translated memory requests from the third interconnect comprises a device identifier assigned to the second I/O node on the second interconnect.

9. The system as recited in claim 7 wherein the IOMMU is configured to access a device table comprising a plurality of device table entries, wherein the IOMMU is configured to select a device table entry responsive to a device identifier (ID) from a given memory request passing through the tunnel, wherein the device ID identifies a source of the given memory request, and wherein the selected device table entry includes either an indication that translation is disabled for the source or a pointer to one or more translation tables storing translation data to translate an address of the given memory request.

10. The system as recited in claim 9 wherein the IOMMU is configured to pass the given memory request unmodified if the device table entry corresponding to the given memory request indicates that translation is disabled.

11. The system as recited in claim 9 wherein the IOMMU is configured to select another device table entry responsive to a device identifier corresponding to an I/O device on the third interconnect, to translate a memory request sourced by the I/O device.

12. The system as recited in claim 9 wherein the device ID of the given memory request identifies the first I/O node as the source, and wherein the selected device table entry includes the pointer.

13. The system as recited in claim 12 further comprises a third I/O node coupled to the first I/O node, the third I/O node comprising an IOMMU.

14. The system as recited in claim 13 wherein a second device ID identifies the third I/O node as the source, and wherein the selected device table entry corresponding to the second device ID includes the indication that translation is disabled.

15. A method comprising:
receiving a memory request from a downstream link of a first interconnect into an input/output (I/O) node, the memory request traveling upstream on the first interconnect, wherein the I/O node operates as a tunnel on the first interconnect;
translating the memory request using an I/O memory management unit (IOMMU) in the I/O node, wherein the translating comprises translating an address of the memory request, wherein the translating is further responsive to an enable indication that controls whether or not translation of memory requests traveling in the tunnel is enabled, wherein the IOMMU is configured to translate the memory requests passing through the tunnel if the enable indication indicates enabled, and wherein the IOMMU is configured to pass the memory requests unmodified if the enable indication indicates disabled;
forwarding the translated memory request on an upstream link of the first interconnect, wherein the downstream link and the upstream link have the same protocol;
receiving a second memory request from a device separate from the downstream link and the upstream link;
translating the second memory request from the device even when the enable indication indicates disabled; and
forwarding the translated second memory request on the upstream link.

16. The method as recited in claim 15 wherein the translating comprises accessing a first device table entry by the IOMMU, wherein the first device table includes a pointer to one or more translation tables storing translating data to translate the address of the memory request, and the method further comprising:
receiving a third memory request from the downstream link;
accessing a second device table entry for the third memory request, wherein the second device table indicates that translation is disabled for the third memory request; and
forwarding the third memory request unmodified on the upstream link responsive to translation being disabled for the third memory request.

17. The method as recited in claim 16 further comprising translating the third memory request prior to the I/O node receiving the third memory request.

18. The method as recited in claim 17 wherein the translation for the third memory request is performed by a second I/O node that is downstream from the I/O node and which includes a second IOMMU.

* * * * *